United States Patent Office 3,629,147
Patented Dec. 21, 1971

3,629,147
OXIDATION CATALYST AND PROCESS
Jamal S. Eden, Akron, Ohio, assignor to The B. F.
Goodrich Company, New York, N.Y.
No Drawing. Application Feb. 16, 1966, Ser. No. 527,726,
now Patent No. 3,530,176, which is a continuation-in-part of applications Ser. No. 483,802, Aug. 3, 1965,
and Ser. No. 485,975, Aug. 13, 1965. This application
Aug. 9, 1968, Ser. No. 847,747
The portion of the term of the patent subsequent
to Jan. 11, 1983, has been disclaimed
Int. Cl. B01j 11/82
U.S. Cl. 252—437                                       4 Claims

ABSTRACT OF THE DISCLOSURE

Catalysts containing manganese molybdate, tellurium oxide and a manganese phosphate are useful in converting propylene or isobutylene in the presence of oxygen to mixtures of acrolein and acrylic acid or methacrolein and methacrylic acid.

---

This application is a division of Ser. No. 527,726 filed Feb. 16, 1966, now U.S. Pat. 3,530,176. Ser. No. 527,726 was a continuation-in-part of Ser. No. 483,802 filed Aug. 3, 1965, now abandoned and Ser. No. 485,975 filed Aug. 13, 1965, now U.S. Pat. 3,392,196.

This invention relates to new and useful catalysts and to a method of preparing unsaturated aldehydes and unsaturated carboxylic acids by oxidation of unsaturated hydrocarbons at an elevated temperature.

The invention relates more particularly to catalysts comprising manganese molybdate, tellurium oxide and manganese phosphate in a molar ratio of 100 $MnMoO_4$, 10-100 $TeO_2$, and 5-50 $Mn_2P_2O_7$ and to a method of preparing acrolein, methacrolein in high yields along with acrylic acid or methacrylic acid by passing vapors of propylene or isobutylene and an oxygen-containing gas over the catalyst at a temperature of from about 325° C. to about 550° C. The catalyst can also be designated as $Mn_{10}Mo_{10}Te_{1-10}Mn_{2-30}P_{2-20}O_{39-120}$ with P being in the form of a phosphate, i.e. each P atom is attached to 3 to 4 oxygen atoms.

In my copending applications there are disclosed catalysts having long life that will convert a substantial amount, more than 50% per pass, of a gaseous monoolefin such as propylene or isobutylene to yield acrolein, methacrolein and acrylic acid or methacrylic acid. The catalyst of Ser. No. 485,795 contains $MoO_3$, $TeO_2$ and $MnP_2O_7$, and provides high yields of acrylic acid. The catalyst of Ser. No. 483,802 contains $MnMo_4$, $TeO_2$ and contains phosphorous oxides. This catalyst also provides high yields of acrylic acid. I have now found, quite unexpectedly, that when a catalyst containing $MnMoO_4$, $TeO_2$ and $Mn_2P_2O_7$ is used to oxidize olefins, that at equivalent temperatures much higher yields of acrolein are obtained than with either of these two catalysts. Mol percent efficiencies of about 45 to about 55 for the aldehyde are obtained with the catalyst and process of this invention wherein manganese is present both as a molybdate and phosphate.

The reactants are (1) propylene or isobutylene and (2) an oxygen-containing gas, which can be pure oxygen, oxygen diluted with an inert gas, oxygen enriched air or air without additional oxygen. For reasons of economy, air is the preferred oxygen-containing reactant.

For the purpose of this invention the hydrocarbons which are oxidized can be defined generically by the formula

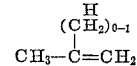

wherein it is also apparent that the end products formed result from the oxidation of only one methyl group on the hydrocarbon molecule while the terminal

remains intact.

Stoichiometric ratios of oxygen to olefin for the purpose of this invention are 1.5 to 1. The molar ratio of oxygen to olefin should be at least 2 to 1. Slightly lower amounts of oxygen can be used at a sacrifice of yield. There is no critical upper limit but when air is used, large excesses will require large equipment investment. It is preferred to use 33 to 66% excess oxygen. A useful range is 1.5 to 4 mols of oxygen per mol of olefin. Larger excesses do not impair the yields of aldehydes and acids, but for practical considerations an excess much above 100% would require extremely large equipment for a given production capacity.

The addition of steam into the reactor along with the hydrocarbon and oxygen-containing gas is desirable but not absolutely essential. The function of steam is not clear, but it seems to reduce the amount of carbon monoxide and dioxide in the effluent gases.

Other diluent gases can be used. Saturated hydrocarbons such as propane are rather inert under the reaction conditions. Nitrogen, argon, krypton or other known inert gases can be used as diluents if desired but are not preferred because of the added cost.

There are several methods for the preparation of the catalyst, which can be supported or unsupported. It is possible to dissolve each of the starting ingredients in water and combine them from the aqueous solutions or the ingredients can be dry blended. Because of the more uniform blend obtained by the solution procedure, it is preferred.

A general procedure for preparing a catalyst is to provide the requisite amount of a manganese molybdate in water, a tellurium compound and a manganese salt in water. Add the requisite amount of phosphoric acid to the manganese salt solution. Add the tellurium compound to the manganese molybdate and then add the manganese salt-phosphoric acid mixture to the manganese molybdate-tellurium mixture. The catalyst is then dried and baked at 400° C. for about 16 hours.

Supported catalysts can be prepared by adding an aqueous slurry of the support to the aqueous solution of catalyst or the aqueous catalyst ingredients can be added to the slurry of the support.

Alternately a slurry of the catalyst ingredients can be prepared in water, then dried and baked. For supported catalysts the aqueous slurry of the catalyst ingredients can be added to an aqueous suspension of the support or vice versa, and then dried and baked.

Another method is to blend the dry ingredients and then mix them thoroughly. The main difficulty is to obtain thorough blending and uniform particle size.

A specific procedure for making the catalysts is as follows:

(a) Slurry 1 mol of manganese molybdate in water.
(b) Slurry 89.2 g. of ammonium tellurate in water. Add the tellurium slurry to the molybdate slurry.
(c) Dissolve 65.31 g. of $MnCl_2 \cdot 4H_2O$ in water and add 38.1 g. of 85% $H_3PO_4$. Add this mixture slowly to the molybdate-tellurate slurry. Dry the mixture on a steam bath and bake for 16 hours at 400° C. Thereafter the catalyst is ground to a mesh size of 10–18 and sieved.

For supported catalysts, suitable supports are silica, silica-containing materials such as diatomaceous earth and kieselguhr, silicon carbide, clay, aluminum oxides and even carbon, although the latter tends to be consumed during the reaction. If the catalyst is to be supported the aqueous solution or slurry of ingredients can be added to an aqueous slurry of the support or vice versa, prior to drying. The procedure after drying is the same as that already described. Thus, to the aqueous catalyst ingredients 240 g. (1.2 mols) of a 30–35% aqueous colloidal dispersion of microspheroidal silica (Ludox H.S.) are added slowly with stirring. Stirring is continued for about ½ hour prior to drying. Another procedure is to add the mixture described under (c) to the Ludox and then add the requisite amount of $TeO_2$ and $MoO_3$ as a slurry. Also the ingredients can be added to the Ludox individually if desired.

Another method is to grind $MnMoO_4$, $TeO_2$ and a manganese phosphate to the proper particle size and then thoroughly mix the dry powders. The mixture can be added to an aqueous slurry of a support or vice versa and thereafter dried and baked.

For fixed bed systems a 10–18 mesh (U.S. Sieve) size is satisfactory. For fluid bed systems the catalyst particle size should be 80–325 mesh (U.S. Sieve).

The exact chemical structure of the catalysts made by the above procedures is not known, but catalysts with molar ratios of 100 MnMo, 10–100 Te and 5–100 of MnP can be used for converting the monoolefinic hydrocarbon to a nitrile. The catalyst contains chemically bound oxygen so that the generic formula can be written as $$MnMoO_4{}_{100}TeO_2{}_{10-100}Mn_2P_2O_7{}_{10-100}$$

The phosphate can be a $PO_4$ radical, pyrolphosphate or a polyphosphate, for example, manganese orthophosphate (ous), pyrophosphate, monohydrogen orthophosphate (ous) and dihydrogen orthophosphate (ous), and metaphosphate (ic).

A preferred catalyst is one having a ratio of about 100 $MnMoO_4$, 33 $TeO_2$ and 10–30 $Mn_2P_2O_7$ because it gives a high yield of desired products, and the preferred support is silica, because of its low cost and good fluidizing characteristics.

The reaction temperature can range from about 300 to 500° C. for the oxidation of propylene but the preferred range is from about 325 to about 425° C. Below 325° C. the conversion per pass is lower than desirable and low temperature tends to produce more aldehyde than desired. Usually, a longer contact time is needed at lower temperatures to obtain the yields of desired products obtainable at higher temperatures. About 425° C. in the propylene oxidation some of the desired end products appear to be oxidized to carbon oxides. This is much more apparent at 450° C. For isobutylene, the preferred range is 300 to 450° C.

The molar ratio of steam to propylene or isobutylene can range from 0 to about 5 to 7 or more, but best results are obtained with molar ratios of about 3 to 5 per mol of olefin and for this reason are preferred.

The contact time can vary considerably in the range of about 2 to 70 seconds. Best results are obtained in a range of about 8 to 54 seconds and this range is preferred. Longer contact times usually favor the production of acid at any given temperature.

The reaction can be run at atmospheric pressure, in a partial vacuum or under induced pressure up to 50–100 p.s.i. Atmospheric pressure is preferred for fixed bed systems and a pressure of 1 to 100 p.s.i. for fluid bed reactions. Operation at a pressure which is below the dew point of the unsaturated acid at the reaction temperature is advantageous.

The data in the examples show yields in percentages of unsaturated aldehydes and acids that can be obtained with a single catalyst, using fixed ratio of reactants but changing the temperature and/or contact time. Further variation is obtainable by controlling the other variables in the reaction including the catalyst compositions within the limits set forth herein.

The examples are intended to illustrate the invention but not to limit it.

THE EXAMPLES

A series of runs was made in a fixed bed reactor of high silica (Vycor) glass tube 12 inches long and 30 mm. outer diameter. The reactor had three inlets, one for air, one for steam and one for propylene. Three external electrically operated heating coils were wound on the reactor. One of the coils extended along the entire length of the reactor and each of the remaining coils extended only about one half the length of the reactor.

Outlet vapors were passed through a short water-cooled condenser. Uncondensed gases were passed through a gas chromatograph (Perkin-Elmer model 154D) and analyzed continuously. The liquid condensate was weighed and then analyzed for acrylic acid and acrolein in the gas chromatograph.

The reactor was filled to about 90% of its capacity with 170 ml. of a catalyst made by the solution method described above, having a ratio of 100 $MnMoO_4$, 33 $TeO_2$ and 16.5 $Mn_2P_2O_7$. The catalyst was not supported and had a mesh size of 10–18 (U.S. Sieve).

Steam at a temperature of 200–250° C. was first passed into the reactor. Then propylene and air were separately fed into the stream of water vapor. This mixture then passed through a preheater and entered the reactor at about 200–250° C. The reactor was preheated to about 285° C. before the gas feed was begun.

The ratio of reactants per mol of propylene, oxygen, steam, cold contact time in seconds, and temperature are shown in the table below. The table summarizes the data obtained in these runs:

| Run No. | Oxygen, mols | Temp., °C. | Steam, mols | Contact time, seconds | Mol percent propylene, converted | Mol percent yield on— | |
|---|---|---|---|---|---|---|---|
| | | | | | | Propylene Acr. | Converted AA |
| 1 | 4 | 359 | 4.2 | 48.5 | 87.96 | 63.10 | 26.79 |
| 2 | 3 | 365 | 4.06 | 46 | 92.68 | 60.96 | 28.51 |
| 3 | 3 | 390 | 4.06 | 46 | 98.66 | 45.49 | 33.33 |
| 4 | 3.04 | 348 | 4.2 | 60 | 85.69 | 61.24 | 26.34 |

I claim:

1. A catalyst composition consisting essentially of manganese molybdate, tellurium oxide and a manganese phosphate in a molar ratio of 100 manganese molybdate, 10–100 tellurium oxide and 5–50 manganese phosphate.

2. The catalyst of claim 1 wherein the manganese phosphate is manganese pyrophosphate.

3. The catalyst of claim 2 wherein the catalyst contains 100 $MnMoO_4$, about 33 $TeO_2$ and 10–30 $Mn_2P_2O_7$.

4. The composition of claim 3 wherein there is about 16.5 $Mn_2P_2O_7$.

References Cited

UNITED STATES PATENTS

| | | | |
|---|---|---|---|
| 3,228,890 | 1/1966 | Eden | 252—437 |
| 3,383,330 | 5/1968 | Kang | 252—437 |
| 3,509,069 | 4/1970 | Eden | 252—437 |

PATRICK P. GARVIN, Primary Examiner

U.S. Cl. X.R.

260—533 U, 604